United States Patent Office 3,168,894
Patented Feb. 9, 1965

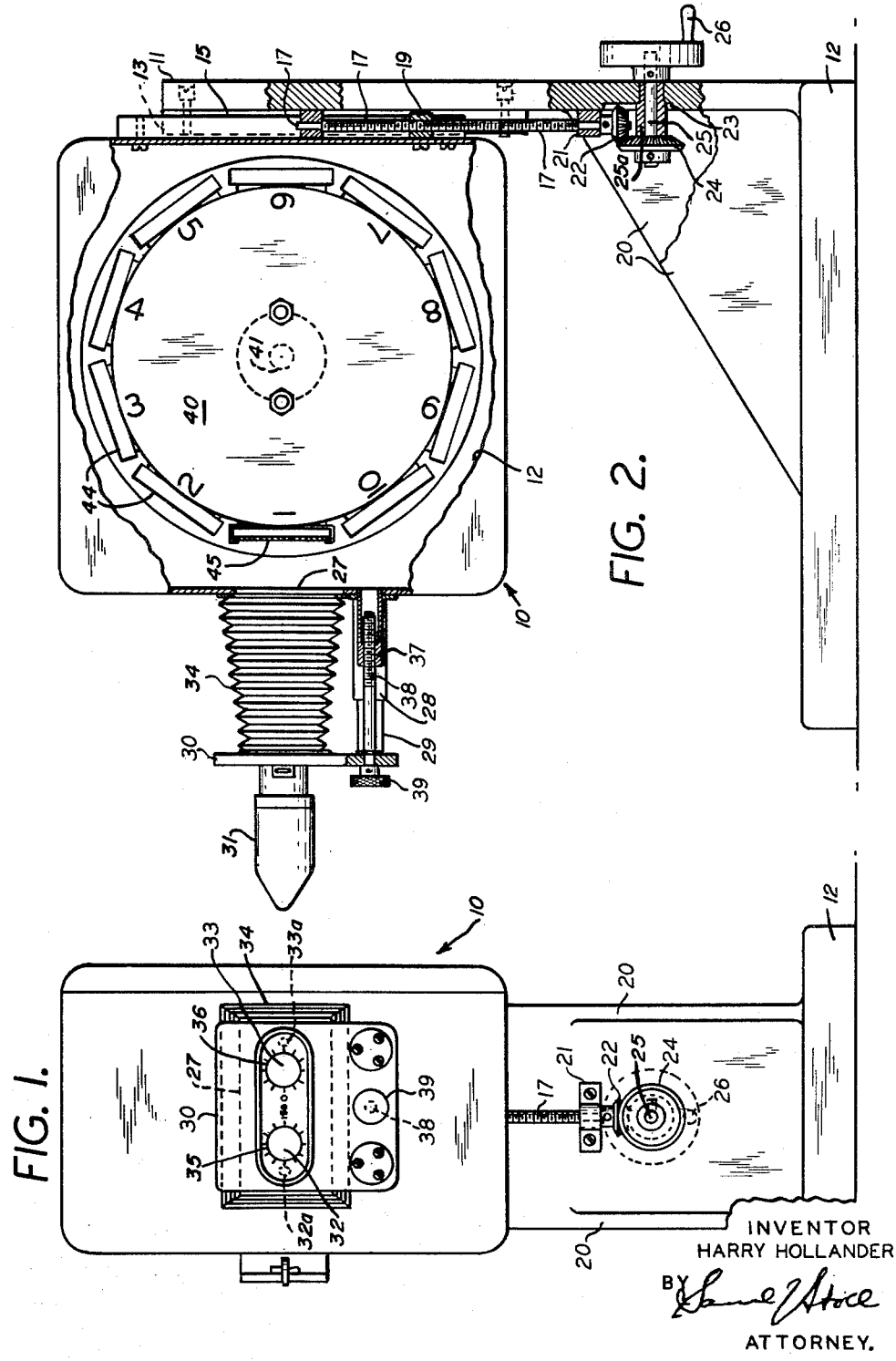

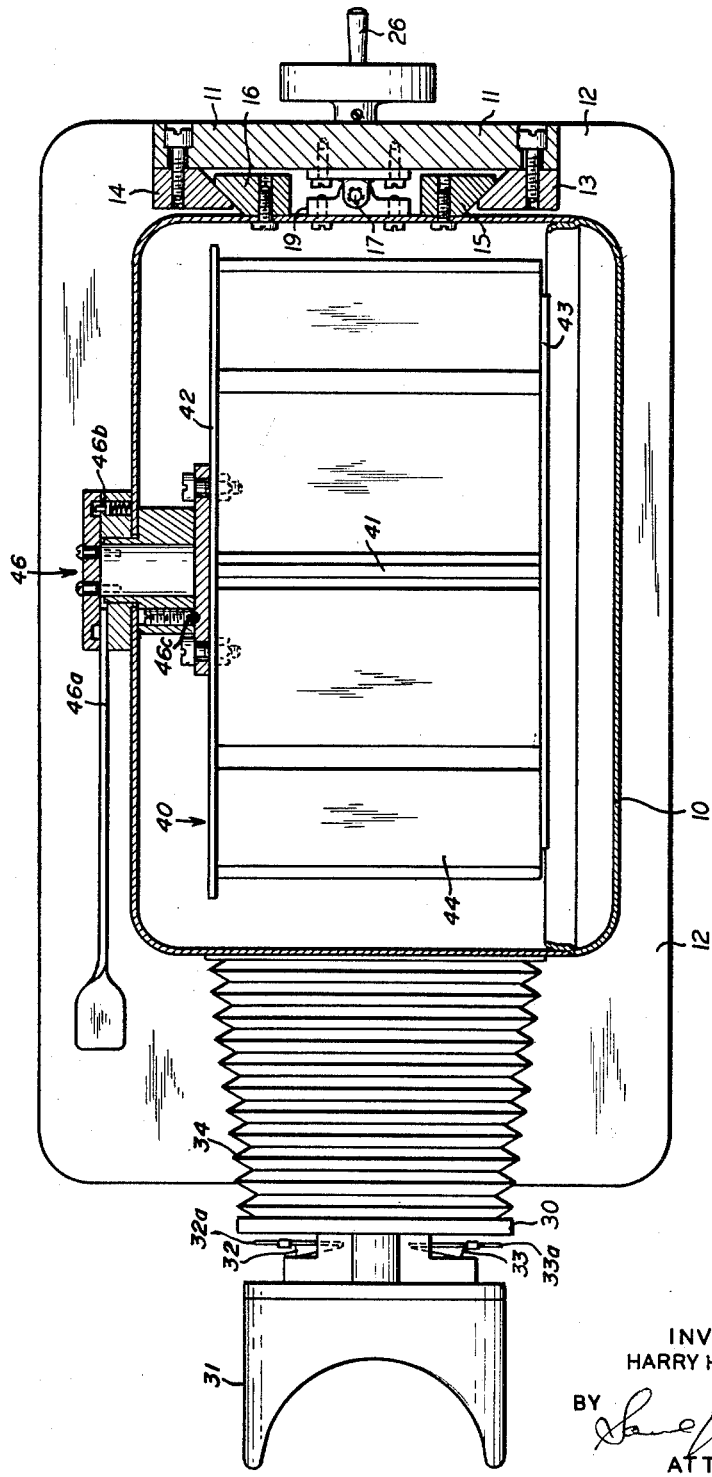

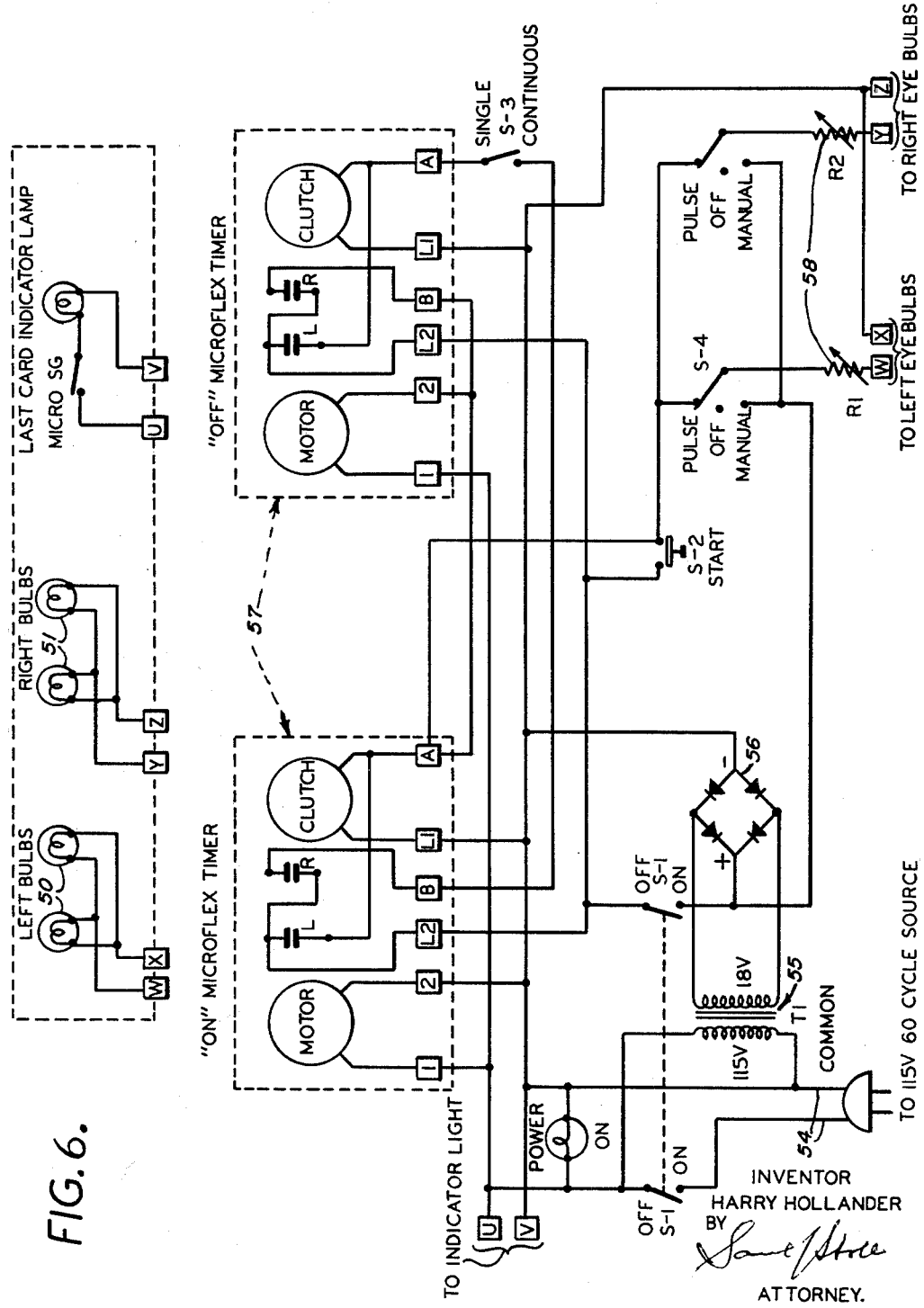

3,168,894
VISION TRAINER
Harry Hollander 23 Burt Court, Valley Stream, N.Y.
Filed July 2, 1962, Ser. No. 206,677
5 Claims. (Cl. 128—76.5)

This invention relates generally to that branch of ophthalmology comprising sight correction, and more particularly, to treatment for the remedy or alleviation of myopia, emblyopia or incipient amaurosis, nystagmus, and other defects of vision by exercise instead of by the use of corrective lenses; and to apparatus to be used by the patient in the performance of certain vision-training exercises under the supervision and guidance of the ophthalmologist or optometrist.

The general object of the invention is to provide a novel, simple, and reliable apparatus of this class.

The invention seeks to provide means to aid the correction of certain visual defects insofar as possible without resorting to the permanent use of lenses. Eyeglasses are not only usually annoying, uncomfortable, and nuisances, but they are actually dangerous in the event of many accidents. Also, spectacles effect a considerable difference in the wearer's appearance, usually disadvantageous; and they are easily broken, often misplaced, occasionally lost, and subject to repair and replacement. Even contact lenses, which are practically invisible and do not detract from the wearer's appearance, and which, comparatively, are not dangerous or easily lost, and which may be made of difficultly breakable plastic, are considerably expensive, and, initially, as a rule, uncomfortable.

Many defects of vision can be remedied or substantially alleviated through exercise; and frequently proper eye-exercise can so improve vision as to permit the patient to wear much weaker glasses than before, if not to permit him to give up lenses entirely. Persons of all ages may be benefited by vision-training, and children and teenagers who are just beginning to wear glasses are particularly well-suited for such training.

Defects of vision sought to be remedied or alleviated by use of the present apparatus are all in part psychological and neuromuscular; and special objects of the invention have to do with the provision of apparatus for the improvement of the senses of fusion or focus, and of stereoscopy or depth, as well as for the increase of reading speed and general visual accuracy and spontaneity. The most common defects of vision found to be subject to complete or substantial remedy by means of eye-exercise are myopia or near-sightedness, amblyopia or incipient amaurosis, and nystagmus, as well as general indolence in observation, the latter constributing to sloth of perception of what is plainly visible and indifference to focal acuity or the distance-gauging advantages of true stereoscopy.

An object of the invention is to provide for the use of ophthalmological patients a viewing camera or box having therein a variety of different targets (each of which may, of course, be designed specially to present to the viewer a different optometrical test); means for moving the targets into the viewer's field of vision in a predetermined order; means for steadily or intermittently illuminating the targets; selective means for varying the timing and duration and also the intensity of illumination of the targets; means for selectively varying both the focus and focal length of the apparatus for testing or accommodating the viewer, or for subjecting the viewer to various focal tasks for the purpose of exercise; and means for raising and lowering the viewing camera or box to accommodate different viewers.

The invention contemplates such a viewing camera or box as described above which may or may not, as desired, comprise as a unit the viewing camera or box and the means for controlling the timing and duration and intensity of illumination of its targets, for such means may be remote and operated either automatically or selectively by the optometrist. The invention will be seen to be quite flexible. All functions contemplated may be variously controlled; the patient may be restricted simply to viewing targets, and the optometrist or other technician may govern all other functions. With obvious modifications the apparatus may be provided with means for recording a particular patient's performance, but such means are not essential to the invention.

These and other objects, features, and advantages of the invention will be more fully understood from the following description, from the annexed claims, and from the drawing.

In the drawing:

FIG. 1 is a front elevational view of the viewing box to be used by the ophthalmological patient for eye exercises to improve vision.

FIG. 2 is an elevational view of the left side of the viewing box, part of which is broken away to show internal structure.

FIG. 3 is a top plan view of the viewing box, also with part thereof broken away to show internal structure.

FIG. 6 is a circuit diagram of the vision trainer, showing various components, some of which are necessarily mounted within the viewing box and others of which are preferably, if not necessarily, mounted within the control unit.

Figure 4:
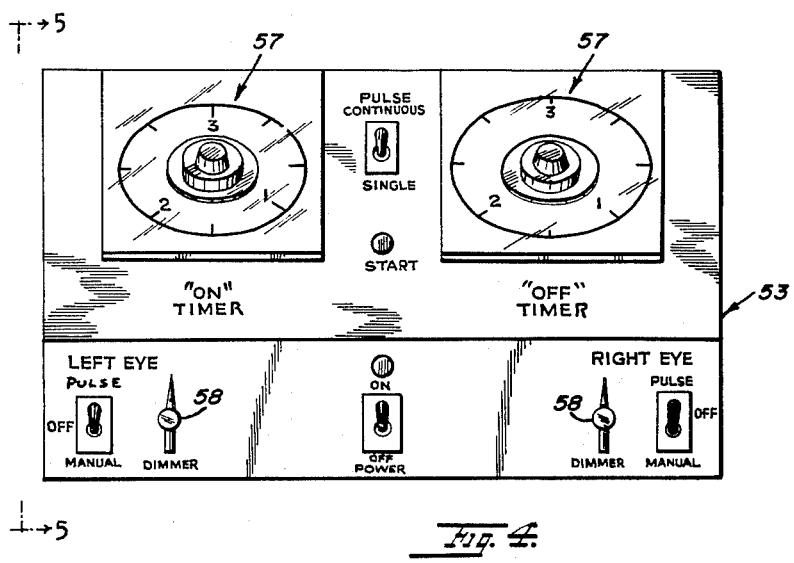
FIG. 4 is a front elevational view of a control unit adapted remotely to control the illumination of targets within the viewing box, including the control of timing and intensity of illumination as well as the relative timing and intensity of the left and right sides of surfaces of targets to be viewed by the patient under the supervision of the optometrist.
Figure 5:
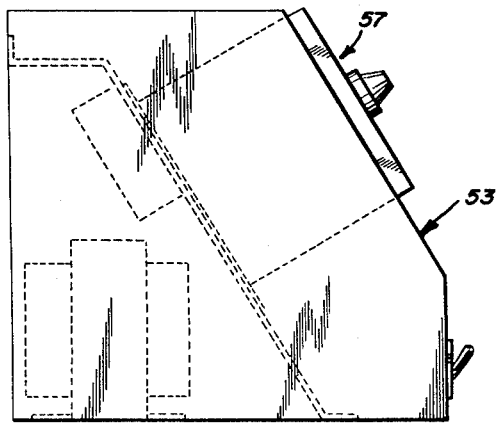
FIG. 5 is a left side elevational view of the control unit, indicating, in dotted lines, certain components contained therein.

The invention is by no means limited to the design or arrangement of apparatus shown. Presently the essential elements of the apparatus are briefly discussed; but here it is desired to point out that the embodiment illustrated in the drawing is merely one of a number of operable reductions to practice of the present invention, but is an embodiment found particularly convenient for manufacture and optometrical use. This embodiment involves two units which may be separately manufactured and portable, but which are required to be connected together electrically and which are only useful for the purposes of the invention when so connected. FIGS. 1-5 show no wiring since the latter may be readily understood from the diagram of FIG. 6.

The present invention calls for a viewing box having two eye openings for the patient or viewer, provided with an appropriate eye-shade of usual manufacture to block ambient illumination and with a lens for each opening with the lenses slightly rotatable with reference to arcuate indexes for rectifying slight astigmatic differences between the lenses of the box and of the eyes of the patient; a drum structure within the box normally rotatable at the election of the patient or viewer, the drum carrying peripherally a spaced sequence of targets, and each target (which may be a card) comprising special figures, color combinations, designs, and patterns and the like, forming special optometrical test charts; lights for steadily and similarly illuminating the right and left portions of each target, intermittently illuminating these portions with varying patterns of timing and intensities for both or each portion separately; and a control unit, preferably handled by the optometrist or his technician, for determining the nature of the illumination of targets.

Since, however, the sequence and optometric characteristics of the targets of the drum structure presumably are known to the optometrist, he is qualified to judge and control the nature of the illumination of not only each target but also each portion of each target; and while the speed of changing of the sequential targets of the viewing box may be customarily under the control of the patient or viewer, the optometrist may, of course, assume control of the entire eye-training apparatus, including the rate of change of sequential targets, the rotational adjustment of the lenses, the adjustment of the distance between the lenses and the target in the patient's or viewer's field of vision, and the adjustment of the height of the viewing box, as well as control of the lighting.

Preferably the vision trainer is built in two units, the viewing box and its supporting structure comprising one unit, and the lighting and timing control means another unit, with the two units connected only by wires, and the latter unit having a lead for plugging the trainer to any convenient 115 v. A.C. outlet. Within the scope of the invention the trainer might well be built as a single unit, and, since no part of it is particularly heavy, the trainer might be built either as a portable single or double unit.

Herein the invention is illustrated in the form of an embodiment comprising two units connected—or which at least may be joined—by wires.

The viewing box, which would literally be a camera obscura if the eye openings were provided with shutters or the equivalent, is seen by itself in FIG. 1, a front elevational view; FIG. 2, an elevational view of the box's left side; and in FIG. 3, a top plan view. Wires connecting the viewing box with the optometrists' control unit are omitted in FIGS. 1, 2 and 3 (but see the diagram of FIG. 6).

The viewing box, in its entirety as a camera, is indexed 10 (arrow) It is roughly a parallelopiped with rounded edges, as shown, and may be made out of any suitable rigid opaque material. The camera proper is about equal in height and in its anterior-posterior dimension, and hardly more than half as great in width from left to right.

The camera proper 10 is supported at the rear center thereof by means for raising and lowering the viewing box. These means comprise an upright plate 11 secured in any suitable manner to a base 12. The upper part of the plate 11 is provided with left and right guides 13 and 14 (best seen in FIG. 3). The back of the camera is provided with guides 15 and 16 respectively adapted to cooperate in keyed and sliding engagement with guides 13 and 14. A screw 17 is adapted for vertical adjustment of the camera and engages nuts 19 (see FIG. 2) fixed to the camera. The base 12, preferably considerably elongated from front to back, as shown in FIGS. 2 and 3, is suited to rest upon any convenient horizontal surface, such as the top of a table or desk; and the perpendicularity of plate 11 with respect to base 12 may be more securely fixed by means of two triangular braces 20. FIG. 2 shows the means provided for vertically adjusting the camera proper, and, more particularly, for rotating screw 17. The lower end of screw 17 is turned down (so as to eliminate its threads) and is journaled in a bracket 21 rigidly fixed to the front surface of plate 11 (see FIGS. 1 and 2). Beneath the bracket 21 the lower turned-down portion of screw 17 carries a bevel gear 22, to clear which the front of the plate 11 is recessed slightly at 23. Gear zontal anterior-posterior shaft 25 rotatably supported in zontal anterior-positioned shaft 25 rotatably supported in bearing 25a on plate 11 (as seen in FIG. 2); and on the rear end of shaft 25 is mounted a crank 26 whereby the shaft 25 and its associated shaft 17 may be rotated for raising and lowering the camera proper.

The front of the camera proper is provided with a fenestration 27 to permit a view of an aligned target therewithin. Protruding horizontally and rigidly from the front wall of the camera proper are two hollow cylinders 28, both open at front and back; and the cylinders are slightly beneath the fenestration and equally distant from the vertical centerline of the front of the camera, the axes of both cylinders being in a common horizontal plane. The purpose of cylinders 28 is to provide a rigid guide for two pistons 29, which are securely attached to and extend rearwardly from a vertically disposed panel 30 desired to be moved back and forth with respect to a target within the camera to accommodate different focal distances (see below), and to serve generally as a support for a conventional eye shield 31 having a pair of rotatably adjustable lenses 32 for the patients' left eye and 33 for the patients' right eye, and for the front end of a bellows 34. The eye shield 31 and the bellows 34, in usual manner, exclude, as far as may be possible, ambient light, so that what the patient may see is a specially illuminated target within the camera. The eye shield 31 is provided with a pair of eye openings 35 and 36, registered respectively with lenses 32 and 33, both of which are provided with frames and handles 32a, 33a in usual manner in optometrical viewers whereby the lenses may individually be rotated a small number of degrees to compensate for any astigmatic differences between the lenses and the eyes of the patient. Handles 32a and 33a are conventionally attached to the lens frames, and are conventionally used by simply moving them arcuately in either direction. No claim is made herein to any special lens-adjusting mechanism, any conventional adjusting mechanism for this purpose being entirely suitable for the purposes of the present invention.

Means are provided for effecting selective movement of panel 30 and eye shield 31, as a unit, forwardly and backwardly, with respect to the camera (and, of course, accommodating expansion and contraction of the bellows 34) for the purpose of lengthening and shortening the distance between the eye openings 35 and 36 of the shield 31 and a registered and specially illuminated target within the camera. Such means comprise an internally threaded sleeve 37 rigidly mounted on the front wall of the camera and extending forwardly therefrom horizontally, as seen in FIG. 2, and a screw 38, journaled in the panel 30 beneath shield 31, having a preferably knurled head 39 forward of panel 30, and engaging sleeve 37.

Mounted within the camera in any suitable manner is a drum structure, designated in its entirety 40, adapted to rotate about a horizontal axis, the structure being here a cantilever pivotally supported only at the right hand side of the camera, as shown in FIG. 3. The specific structure illustrated is merely one of a variety available within the scope of the invention. The present structure comprises a tubular axle-like member 41 which serves to connect two registered and spaced circular plates 42 and 43, a single pivotal construction presently to be described, ten target holders 44, briding the plates 42 and 43, the holders being equally spaced circumferentially, and there being, here, ten of such holders with their centers obviously 36° apart, and ten targets 45 (actually cards; see the descriptions above and below.

On the right hand wall of the camera is a step-by-step rotary unit, generally indexed 46 (most clearly shown in FIG. 3), of common design. This step-by-step rotary unit may comprise a manually operable lever or handle 46a, as shown, connected by any conventional intermittent actuating means to the drum or drum shaft. This may be in the form of a spring-urged drive pin 46b. A spring-urged indexing ball-and-socket means 46c may be used to index the drum in order to register the cards mounted thereon with the viewing lenses. No claim is made to any special design or mechanism for intermittently rotating and indexing the drum.

The camera is provided with a light source adapted to radiate variously upon each side—left or right—of the target to be viewed by the patient. The source, as of each side, may be one or more (low-voltage) lamps.

These two (independent) light sources are preferably excited from the control unit by the optometrist himself.

The light source adapted to illuminate the left side of the target within the camera comprises incandescent bulbs 50, and that source arranged to illuminate the right side of the target comprises incandescent bulbs 51.

It has been said that the control of the sequence or targets of the viewing box be normally delegated to the patient; but it is desirable that the investigating optometrist have control over the nature of the illumination of the best target. Therefore, preferably, the lighting-control unit is separate from the viewing box and is generically designated 53 (arrow). This last mentioned unit comprises any suitable chassis, box, or structure containing electrical components of the generally selective type, including, of course, various switches and rheostats. The principal desideratum with respect to the control unit is that the selective illumination pattern of the viewing box be variously controlled by the therapist, i.e., the ophthalmological doctor himself.

Therefore the control unit (shown in FIGS. 4 and 5, and more specifically elucidated in the wiring diagram of FIG. 6) comprises an extension cord 54, cf. FIG. 6 only, for connecting the unit to a common 115 v. A.C. outlet; a transformer 55 for reducing the voltage down to something like 18 volts; a wheatstone bridge 56 for rectification; one or more timing motor-switch arrangements 57 for regulating the time sequence, duration and periodicity of both or either one of the target-illuminating light sources; and one or more rheostats 58 for governing the intensity of target illumination; and such switches as may be required to change the illumination pattern from selective to automatic.

The operation of this device may readily be determined from the circuit diagram (FIG. 6) and from the control panel (FIG. 4). It will be noted that two timers are provided, one designated "on" timer and the other designated "off" timer. As appears in FIG. 4, each of these timers is provided with a time-setting dial which may be actuated in conventional manner. The "on" timer may be set to light the bulbs at predetermined time intervals and the "off" timer may be set to extinguish them at predetermined time intervals.

It will be noted that the operation may be applied to the left eye and right eye bulbs, or to the left eye bulbs alone, or to the right eye bulbs alone, depending upon how the switches are set. In FIG. 4, the switch which appears under "left eye" may be set at "pulse" for automatic operation under the control of the timers, or it may be set at "manual" for manually controlled lighting of the bulbs. This is equally true of the switch which appears under "right eye" in FIG. 4. Adjacent each switch is a dimmer, which is connected to the corresponding rheostat R1 or R2 shown in the circuit diagram.

It will appear from the foregoing that the present device is based upon the principle of manual operation of the card-supporting drum, and either manual or automatically timed operation of the illuminating means. In the normal use of this device, the automatic timing means are employed to light and extinguish the bulbs for both eyes or either eye, depending upon the setting of the switches.

What is claimed is:
1. Vision training apparatus comprising a viewing box provided with eye holes, a shade against ambient illumination, lenses adjustable to compensate for astigmatic differences between the lenses and the eyes of a patient to be trained; a drum structure withi nthe box rotatable on a horizontal axis by means controllable by the patient, the drum structure carrying peripherally a sequence of targets each designed to test particular optometrical properties; lights within the box for illuminating the targets; and means controllable by an optometrist for selectively illuminating each target brought into the patient's field of vision continuously or intermittently; for timing the periodicity of illumination, and for varying the intensity of illumination, said box containing at least one light for the left side and at least one light for the right side of the target in the patient's field of vision; and leads connecting the lights with the means controllable by the optometrist; and wherein the means are provided with a source of power; with two variable independent timers for the lights relating to the left and right sides of the target, with means for actuating the timers connected with the source; with two independent rheostats for the lights relating to the left and right sides of the target; and selective switching means for directly connecting both lights simultaneously with the source in series through one of the timers, for connecting both lights with the source with one light in series with one timer and the other light in series with the other timer, for connecting both lights with the source with one light in series with one rheostat and the other light in series with the other rheostat, and for connecting both lights with the source in series with one of the rheostats.

2. The apparatus of claim 1, including means for varying the distance between the patient's eyes and the lenses and the most proximate target of the drum structure to accord with the patient's focal distance.

3. The apparatus of claim 1, wherein the viewing box is supported upon a base suited to rest upon a level horizontal surface, such as that of a table, the box being so supported by a standard of variable length rising from the base.

4. The apparatus of claim 1, wherein the targets are each two nearly similar and laterally adjacent designs off register with respect to each other by that measure suited to induce stereoscopy when viewed simultaneously through a viewer by both eyes of a person having, preferably, normal eyesight.

5. The apparatus of claim 1, wherein the targets are each nearly similar and laterally adjacent designs off register with respect to each other in a predetermined degree to produce a particular stereoscopic effect and to test particular degrees of steropsis, fusion and binocular vision.

References Cited in the file of this patent
UNITED STATES PATENTS

| | | |
|---|---|---|
| 1,199,965 | Couden | Oct. 3, 1916 |
| 1,802,997 | Yetta | Apr. 28, 1931 |
| 1,808,176 | Pieper et al. | June 2, 1931 |
| 2,089,863 | Updegrave | Aug. 10, 1937 |
| 2,234,240 | Frohring et al. | Mar. 11, 1941 |
| 2,715,852 | Ellis | Aug. 23, 1955 |
| 2,798,408 | Ellis et al. | July 9, 1957 |
| 3,012,472 | Feinberg et al. | Dec. 12, 1961 |